(12) United States Patent
Aga et al.

(10) Patent No.: US 12,226,713 B2
(45) Date of Patent: Feb. 18, 2025

(54) INSTALLATION FOR MULTIPLE SKIMMING

(71) Applicant: SEARAS AS, Bergen (NO)

(72) Inventors: Morten Aga, Bergen (NO); Eldar Lien, Bergen (NO)

(73) Assignee: SEARAS AS, Bergen (NO)

( * ) Notice: Subject to any disclaimer, the term of this patent is extended or adjusted under 35 U.S.C. 154(b) by 579 days.

(21) Appl. No.: 17/606,283

(22) PCT Filed: Apr. 29, 2020

(86) PCT No.: PCT/NO2020/050108
§ 371 (c)(1),
(2) Date: Oct. 25, 2021

(87) PCT Pub. No.: WO2020/222654
PCT Pub. Date: Nov. 5, 2020

(65) Prior Publication Data
US 2022/0193577 A1    Jun. 23, 2022

(30) Foreign Application Priority Data
Apr. 29, 2019  (NO) .................................. 20190561

(51) Int. Cl.
*B01D 53/02* (2006.01)
*A01K 63/04* (2006.01)
(Continued)

(52) U.S. Cl.
CPC ........ *B01D 19/0005* (2013.01); *A01K 63/045* (2013.01); *B01D 19/0057* (2013.01);
(Continued)

(58) Field of Classification Search
CPC ........ A01K 61/10; A01K 61/60; A01K 63/04; A01K 63/045; C02F 1/20; C02F 1/38; C02F 1/74; F04F 1/18; Y02A 40/81
See application file for complete search history.

(56) References Cited

U.S. PATENT DOCUMENTS 2,766,203 A * 10/1956 Brown ............... B01D 17/0205
                                                                        210/194
4,226,705 A * 10/1980 Lecoffre .................. B03D 1/24
                                                                        210/220

(Continued)

*Primary Examiner* — Christopher P Jones
(74) *Attorney, Agent, or Firm* — Flener IP & Business Law; Zareefa B. Flener

(57) ABSTRACT

Apparatus (10) for removing gases in a liquid, and/or for removing foam and particles from a liquid and/or for the transport of liquid, the device (10) comprises conduits (16) for transporting the liquid from a first location to a second location, where the conduit (16) comprises a first upstream conduit portion (16*a*) for receiving of liquid, a substantially horizontal conduit portion (16*b*), a downstream conduit portion (16*c*) to discharge liquid out of the conduit (16), and a venting conduit portion (16*d*) to discharge gases, particles and a part of liquid out of the conduit (16) via conduit portion (16*e*) and means (17) arranged in the upstream conduit portion (16*a*) and/or horizontal conduit portion (16*b*) for supplying microbubbles to the conduit (16), and that in the conduit (16) means (19) are provided for establishing vacuum in parts of the conduit (16), characterized in that the device (10) in the conduit portion (16*b*) comprises two or more venting conduit portions (16*d*).

18 Claims, 5 Drawing Sheets

(51) Int. Cl.
    *B01D 19/00*     (2006.01)
    *C02F 1/20*     (2023.01)
    *C02F 1/38*     (2023.01)
    *C02F 1/74*     (2023.01)
    *A01K 61/10*     (2017.01)

(52) U.S. Cl.
    CPC ............... *C02F 1/20* (2013.01); *C02F 1/38* (2013.01); *C02F 1/74* (2013.01); *A01K 61/10* (2017.01)

(56) References Cited

U.S. PATENT DOCUMENTS

| | | | | |
|---|---|---|---|---|
| 4,780,217 | A | * | 10/1988 | Petersen ............... B01F 35/754 210/150 |
| 6,132,494 | A | * | 10/2000 | Kjos ....................... B04C 5/081 96/182 |
| 2017/0252714 | A1 | * | 9/2017 | Bennett ................... B01F 31/87 |
| 2018/0029902 | A1 | * | 2/2018 | Andrews ................... C02F 1/20 |
| 2019/0233316 | A1 | * | 8/2019 | Miller ....................... C02F 9/00 |
| 2021/0092941 | A1 | * | 4/2021 | Aga ..................... A01K 63/042 |

* cited by examiner

INSTALLATION FOR MULTIPLE SKIMMING

AREA OF THE INVENTION

The present invention relates to a device for removal of gases and particles from a liquid, and/or for the transport of the liquid.

BACKGROUND TO THE INVITATION

In many systems, there is a need to remove gases and small particles from a liquid. This is the case, for example, in fish farming installations where the fish in the installation produce $CO_2$ and where feed residues and faeces from the fish lead to accumulation of organic material which is difficult to filter out through traditional mechanical filters. If the liquid is to be recycled back to the installations, as in so-called RAS installations, then $CO_2$ must be removed, and preferably be replaced with $O_2$, and that most of the small particles should be removed to give the fish a good environment. Small particles of organic matter provide nourishment for the heterotrophic bacteria that compete with the autotrophic bacteria in the biofilter. The best way to help the autotrophic bacteria is to limit organic matter which is the nourishment of the heterotrophic bacteria. Extraction of organic material also reduces the risk of $H_2S$ in the plant. A good skimming will also remove bacteria and viruses from the water.

In order to vent the water for $CO_2$, it is important that air is injected in the form of microbubbles into the water. This gives a large contact surface between the air and the water, and thus the gas exchange becomes more efficient, while at the same time the underpressure will help drive the gas out of the water and into the air. Microbubbles are also the key to getting the smallest particles (<40 μm) bound to the bubbles so they come with these up and out of the system.

Water treatment is also needed in many other contexts such as, for example, treatment of wastewater.

OBJECTS OF THE PRESENT INVENTION

Thus, it is an object of the present invention to provide a solution in which gases and the smallest particles are removed from a liquid. Preferably, it is an object to provide a solution for the removal of $CO_2$ and organic particles, but it is intended that the solution can be used to remove any gas and type of particle (e.g., microplastics) that are dissolved in a liquid.

It is also an object of the present invention to provide a solution in which smaller particles and foam are removed from a liquid.

The solution which is produced is based in part on the principle of siphoning and the establishment of an underpressure in a section of a pipeline, and in this way one can also transport a liquid from one container to another.

Thus, it is also an object of the present invention to provide a solution that can move a volume of liquid from one container to another, or from one location to another location in the same container.

We have found that in connection with the movement of liquid in a fish farm, it is possible to move a liquid and fish that are in the liquid, and at the same time expose the liquid to degassing and removal of particles/foam.

SUMMARY OF THE INVENTION

The present invention relates to a device for the removal of gases in a liquid, and/or for the removal of foam and particles from a liquid and/or for the transport of liquid, where the device comprises pipelines to transport the liquid from a first location to a second location, wherein the pipeline comprises of a first upstream pipe section for the intake of liquid, an, in the main, horizontal pipe section, a downstream pipe section for conveying liquid out of the pipeline, and a venting pipe section for passing gases, particles and a section of liquid out of the pipeline via a pipe section (16e), and that means are provided in the upstream pipe section and/or horizontal pipe section for supplying microbubbles to the pipeline, and that means (19) are arranged in the pipeline for establishing an underpressure in sections of the pipeline, characterised in that the device in the pipe section is comprised of two or more venting pipe sections.

In one embodiment, the venting sections in the pipe section (16b) can have any geometric shape.

In one embodiment, the venting sections in the pipe section (16b) have a circular shape.

In one embodiment, the venting sections in the pipe section (16b) have a rectangular shape arranged to establish a venting duct.

In one embodiment, said two or more venting pipe sections are arranged adjacent to the horizontal pipe section, or in the transition between the horizontal pipe section and the downstream pipe section.

In one embodiment, the device comprises 3, 4, 5 or more venting sections.

In one embodiment, a pipe section for the discharge of gases, particles, and the part of the liquid separated from the venting pipe sections is arranged adjacent to each venting pipe section.

In one embodiment, one or more injector/ejector means is provided in the pipeline for the supply of gases to the pipeline.

In one embodiment, the injector/ejector means are arranged in a horizontal pipe section.

In one embodiment, injector/ejector means are provided just downstream of one or more of said venting pipe sections.

In one embodiment, the injector/ejector means are arranged in the upstream pipe section, preferably in a lower section of the upstream pipe section.

In one embodiment, pipe sections are arranged in connection with each venting pipe section for the discharge of gases, particles and liquid which are separated in the venting pipe sections.

In one embodiment, each of the injectors/ejectors is connected to a pump for the supply of water under pressure to the ejectors.

In one embodiment, each of the injectors/ejectors is connected to an open air hose which conducts air to the ejectors.

In one embodiment, gases, particles and liquid from one or more of the pipe sections are passed to a cyclone which separates gases from the liquid.

In one embodiment, means are provided to an upper section of the cyclone to establish an underpressure in the cyclone and venting pipe sections.

In one embodiment, 0-25%, more preferably, 0.01-10% of the liquid that is led through the pipeline is passed through the venting pipe section (16e).

In one embodiment, a pumping device is arranged for pumping liquid in via an upstream pipe section or horizontal pipe section.

In one embodiment, the upstream pipe section and/or horizontal pipe section is comprised of a garland with openings, adapted for passively sucking in air to the liquid stream which is led through the horizontal pipe section.

In one embodiment, a device for adding air is provided in the venting pipe section to provide an additional lift on the foam.

In one embodiment, upstream pipe sections and/or horizontal pipe sections are comprised of pumping means set up for injecting liquid into said pipe sections.

In one embodiment, the venting pipe sections are equipped with valves which can regulate the fluid height and thus the amount of liquid that is withdrawn.

In one embodiment, the first volume of liquid and the second volume of liquid are the same, i.e. the liquid is transferred via a pipeline to a different position in a container, such as a net cage.

In one embodiment, said pumping device is a propeller pump or ejector pump.

In one embodiment, said means for establishing an underpressure is a vacuum pump or a fan.

In one embodiment, the venting pipe sections have a certain volume which ensures a large liquid:gas interface, and that the liquid circulates slowly via the pipeline, thus reducing the amount of gas that passes with the liquid via the downstream pipe section to the second liquid volume.

In one embodiment, the device is arranged in an installation for the farming of marine organisms.

In one embodiment, the device is arranged in a net cage, and the net cage is comprised of a float collar that keeps the device afloat in a net cage system.

In one embodiment, the liquid flow through the device is achieved, in whole or in part, by the supply of air from the injector so that the liquid column in the upstream pipe section is made lighter than in the downstream pipe section.

In one embodiment, the device is arranged in an installation for the treatment of waste water.

In one embodiment, in the pipeline for the supply of oxygen, means are arranged so that oxygen is supplied to the liquid before the discharge via the downstream pipe section.

In one embodiment, the underpressure in the pipeline and cyclone is sufficient to carry foam and smaller particles with the gas-liquid stream out of the pipeline.

In one embodiment, the liquid level in liquid volume A and liquid volume B is different, so that the water throughflow in the pipeline is wholly or partly driven by the level difference.

In one embodiment, larger units, such as fish, are transported with the fluid stream out of the downstream pipe section.

In one embodiment, the venting duct (16*h*) is arranged in the pipeline (16*b*) in an upward-facing position.

In one embodiment, the venting duct (16*h*) is formed, relative to the pipeline (16*b*), as an external top section (16*h*)

In one embodiment, the top surface section (16*h*) has a rectangular configuration.

In one embodiment, one or more wall sections of the top section can be adjusted so that the opening in the air duct can be adjusted so that how much foam/liquid is sucked out can be controlled.

In one embodiment, the horizontal pipe section (16*b*) in cross section can have a geometric shape chosen from circular, oval, square or rectangular.

In one embodiment, the horizontal pipe section (16*b*) acts as a carrier and is capable of carrying its own weight.

In one embodiment, one or more venting sections (16*d*) and one or more pipe sections (16*e*) are arranged in the longitudinal direction of the horizontal pipe section (16*b*).

DESCRIPTION OF FIGURES

Preferred embodiments of the invention shall, in the following, be described in more detail with reference to the accompanying figures, in which.

DETAILED DESCRIPTION OF THE INVENTION

Figure 1:
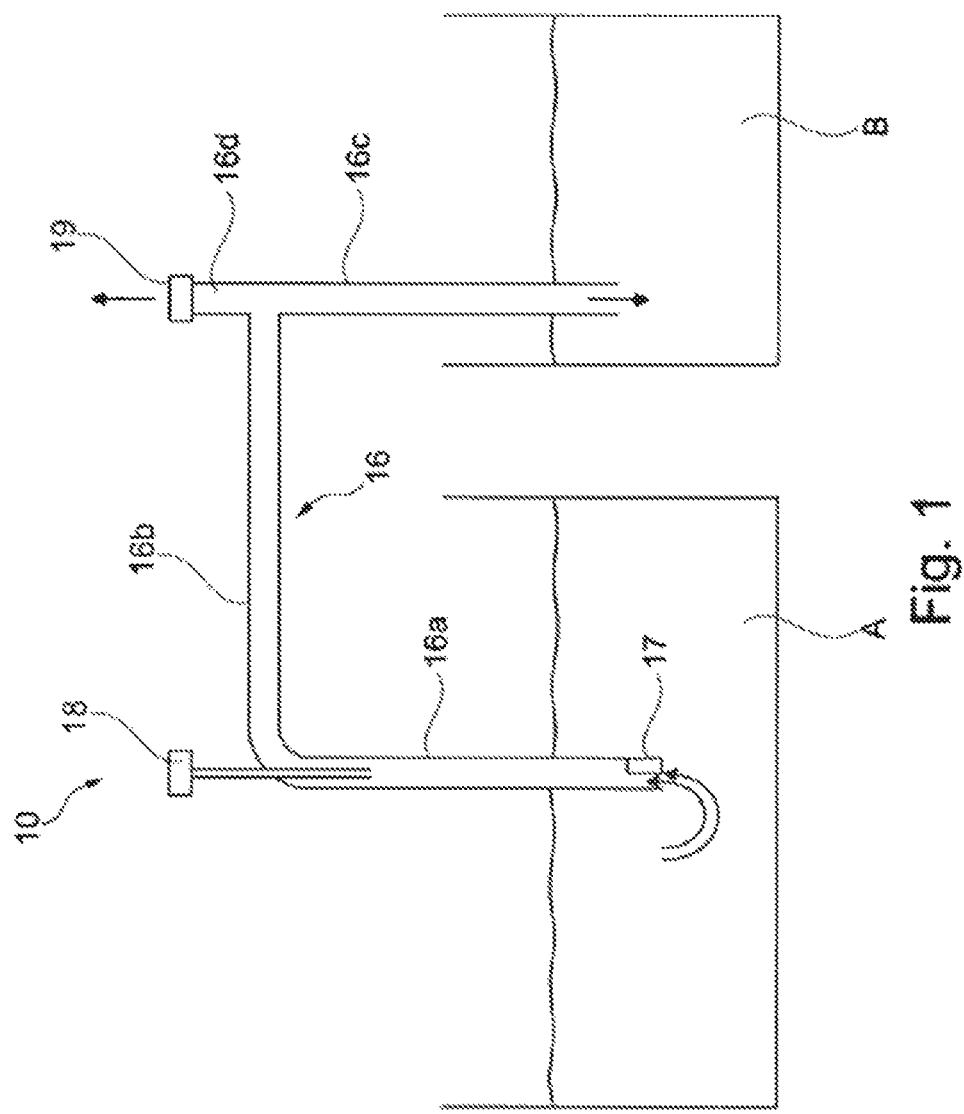
FIG. 1 shows schematically a device for the removal of gases and particles from a liquid which is passed through a pipeline.

FIG. 1 shows the principle for the cleaning of a liquid as it is passed through pipelines 16. The liquid can be moved from a first liquid volume A to a second liquid volume B as indicated in FIG. 1, but the liquid can also be moved from one point in liquid volume A to another point in liquid volume A, i.e. from a location in liquid volume A to another location in the same vessel. Often, it is appropriate to move a fluid from the centre of a container to a point closer to the container periphery.

As shown in FIG. 1, arranged in a first liquid volume A are one or more pipelines 16 for the circulation of water from a first liquid volume A to a second liquid volume B. There may, of course, be several such pipelines 16 for the circulation of water from a first to a second fluid volume B. The pipelines 16 have an upstream pipe section 16*a* that extends from the first liquid volume A and the, in the main, vertically upward to above the surface level of the first liquid volume A, and this upstream pipe section 16*a* is used for the intake of liquid to the pipeline 16.

In a section above the liquid level in liquid volume A, there is an upstream pipe section 16*a* in fluid communication with a horizontal pipe section 16*b*. Preferably, this pipe section 16*b* is arranged gently inclined, or mainly horizontal. Downstream of the horizontal pipe section 16*b*, the liquid is further transported through a downstream pipe section 16*c*. This downstream pipe section 16*c* is arranged, in the main, vertically and carries the liquid out of the pipeline 16 and over to the liquid section B. The horizontal pipe section 16*b* can, in some preferred embodiments, be of a considerable length so that the liquid is transported a considerable distance. In a section 16*d*, gases, foam and some liquid are removed from the main fluid stream. This section 16*d* is preferably connected to pipe section 16*b* or in the transition between pipe section 16 and pipe section 16*c*.

In a section of upstream pipe section 16*a*, the horizontal pipe section 16*b*, or the pipe section 16*d*, an injector 17 is arranged. The injector 17 supplies gas microbubbles, preferably air, to the pipeline 16. The microbubbles which are transported through the pipeline 16 together with the liquid from liquid volume A will cause gases and smaller particles that are dissolved in the liquid volume A to seek the microbubbles. For example, if $CO_2$ is dissolved in the first volume of liquid A, this will be drawn to the microbubbles and could be vented out of the liquid in the tube section 16d. By the term "injector" is meant any supply of a gas into a liquid stream so that microbubbles of gas or air are formed in the liquid. The term thus also covers an "ejector" which is based on the gas being passively sucked into the liquid jet (venturi) and an "injector" which is based on something being injected (forced) into the liquid/gas stream.

An underpressure is established in the pipeline 16 in that means 19 to generate an underpressure is in communication with the pipeline 16. The liquid flow that goes through the horizontal pipe section 16b is then separated by the pipe section 16b going over to a downstream pipe section 16c where the majority of the liquid flows through and to a venting section 16e (shown in FIG. 2) where gases are extracted from the pipeline 16 due to the established underpressure and the microbubbles supplied. By adjusting the underpressure in the pipeline 16, and adjusting the dimensions (diameter) of the downstream pipe section 16c and the venting section 16d, it is possible to also transfer a part of the fluid that flows through the horizontal pipe section 16b via the venting section 16e.

Tests have shown that it is possible to transfer up to 25% of the liquid via the venting section 16e. However, it is preferred that between 0.01 and 10% of the liquid is taken out via the venting part 16e and the remaining liquid is passed through the downstream pipe section 16c.

The supply of gases, preferably air, will ensure that the liquid which rises in the pipeline in upstream pipe section 16a or horizontal pipe section 16b is lighter and also lighter than the liquid which is discharged from the pipeline via pipe section 16c as gases/air is removed from the liquid in a venting section 16d. In that the liquid in pipe section 16a is lighter than in pipe section 16c the flow and transport of the liquid through the pipeline 16 are established. Experiments have shown that with sufficient supply of air via injector 17 and the establishment of a sufficient underpressure via fan 19, the liquid is transported at a sufficient speed through the device 10, without the need to use pumps to pump the liquid.

There will also be the lighter part of the liquid (which has a large amount of dissolved gas bubbles) discharged via the venting pipe section 16e.

In some embodiments of the device 10, in a section of the pipeline 16, i.e. in either the upstream pipe section 16a, horizontal pipe section 16b or downstream pipe section 16c, a pumping device 18 is preferably arranged to pump the water up from the first volume of liquid. Preferably this is a propeller pump 18 which is suitable for pumping large quantities of low-pressure water. For example, as shown in FIG. 1, the pump is arranged in the upstream pipe section 16a such that liquid is drawn from the first volume of liquid via the upstream pipe section 16a.

In the solution which is shown in FIG. 1 the pipe section 16b has a considerable length, and it is slightly sloped downwards so that liquid which is pumped to the top of the pipe section 16b will flow through the pipe section 16b. A large liquid surface is generated and this provides effective removal of any gases that are in the first volume of liquid A. Thus, the liquid contains a lesser amount of dissolved gases after it has passed through pipe section 16b and the venting section 16d.

If the device 10 is used in a fish farm, the first volume of liquid A is usually the water reservoir in which the marine organisms, such as fish, live, and this will eventually contain large amounts of dissolved $CO_2$. It is therefore an aim of the present invention to remove this $CO_2$ or to simultaneously replace it with oxygen or air. In the first liquid there is a relatively high content of $CO_2$ and low $O_2$. Furthermore, there will be a mixture of water and small air bubbles in the pipeline sections 16a and 16b, and $CO_2$ goes from being dissolved in water and into the air bubbles due to the equilibrium principle. In embodiments of the invention which are not shown in the figures, there will be means in the downstream pipe section 16c for the supply of oxygen to the liquid which flows out of the pipeline 16 via the downstream pipe section 16c.

As shown in FIG. 1, there is in a section, preferably in the transition between the horizontal pipe section 16b and the downstream pipe section 16c, a device 19 arranged to establish an underpressure in the pipe section 16b. This is shown by a fan 19 in FIG. 1. The air bubbles in the liquid will be with such an underpressure drawn out of the liquid which flows through horizontal pipe section 16b and further via the venting section 16d to the downstream pipe section 16c. Due to the underpressure and large surface area between the air bubbles and water, this method will effectively remove $CO_2$ and other gases from the liquid.

Figure 3:
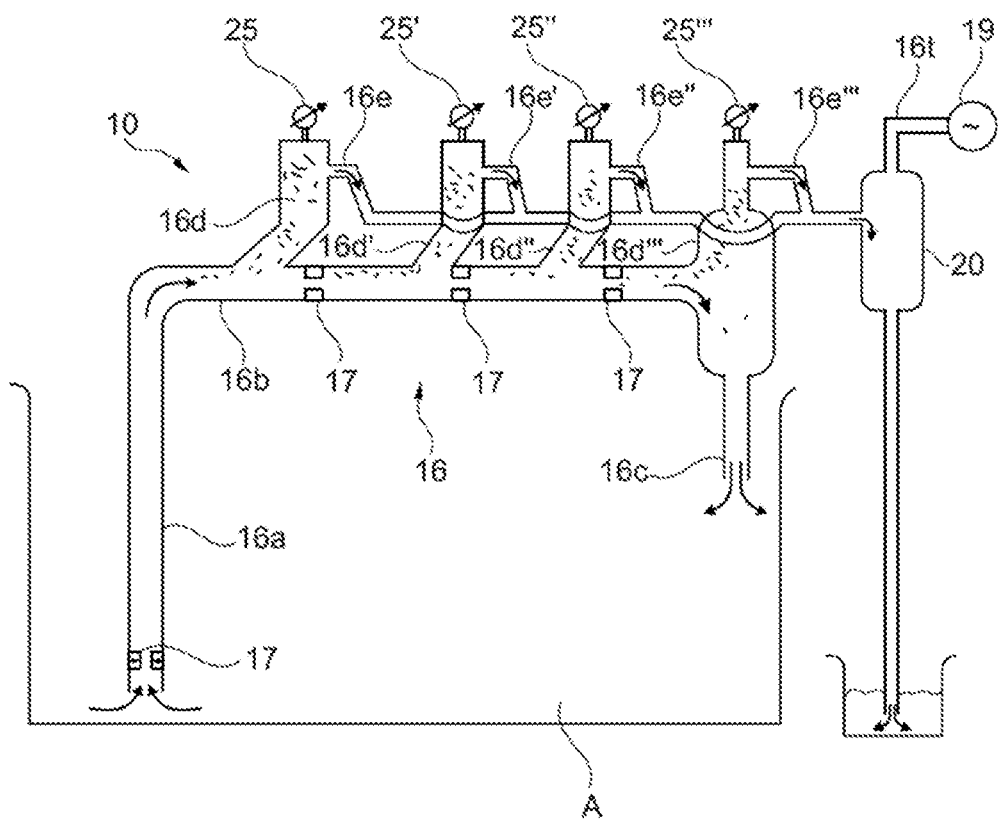
FIG. 3 shows an embodiment in which the horizontal pipe section is provided with several sections for the extraction of gases (and smaller sections of liquid).

As shown in FIG. 1, the liquid in the first volume of liquid can be exchanged for gases as it is passed through the device 10, i.e. through the different pipe sections 16a, 16b and 16c. Along with this exchange of gases, the device 10 can be used to move liquid. As shown in FIG. 1, liquid is transported from the first liquid volume A via the pipeline 16 to a second liquid volume B. This can be from one net cage to another net cage or it can be from one segment of one net cage to another segment of the net cage. In some embodiments, the liquid which is transported through the pipeline 16 is returned to the same volume of fluid from which it is retrieved, i.e., the first and second volumes of liquid are the same net cage or net cage segment (as shown in FIG. 3).

Figure 2:
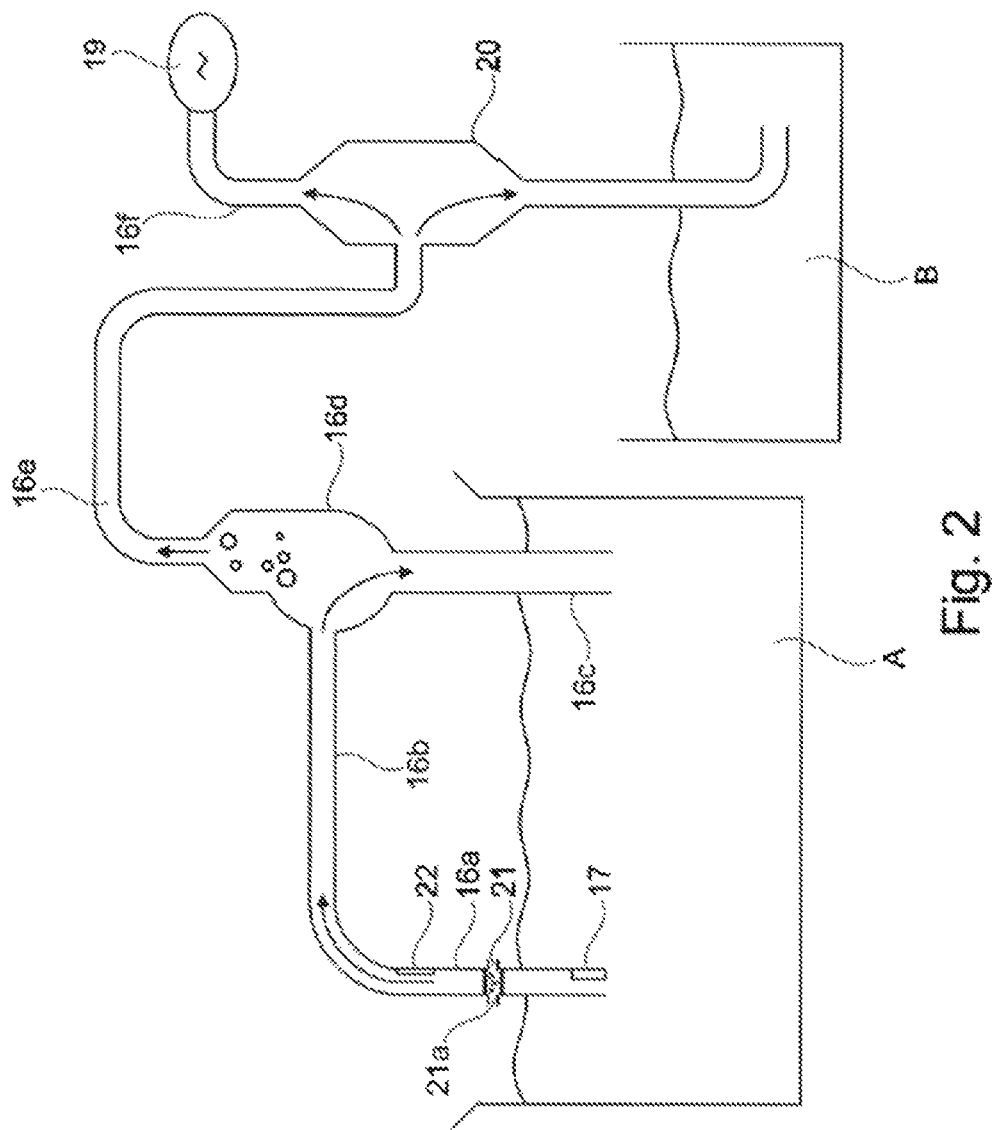
FIG. 2 shows schematically a device for the removal of gases from a liquid, by gases, particles and liquid being further separated into a cyclone.

FIG. 2 illustrates an alternative solution to show the principle of the present invention i.e., there is in addition to the solution in FIG. 1, a cyclone 20 used to separate gases and liquid. It can be seen from FIG. 2 that the device comprises an, in the main, vertical upstream pipe section 16a which passes into an, in the main, horizontal pipe section 16b. In the pipe section 16a means are arranged for the supply of air, preferably microbubbles of air. It is not necessary, but in some embodiments, means 18 (not shown in FIG. 2) in the upstream pipe section 16a are also used to draw water from a first liquid volume A and through the pipeline 16. In the transition between the horizontal pipe section 16b and the downstream pipe section 16c, a venting section 16d is established so that gases, at transport of liquid and air in via the upstream pipe section 16a and horizontal pipe section 16b, in a venting section 16d are removed from the liquid and discharged from the pipeline 16 via venting pipe section 16e. Discharged from the venting section 16d, foam with particles and gases is extracted via the pipe section 16e, with means 19 being provided in the pipe section 16e or in conjunction with the pipe section 16e to establish an underpressure in the venting section 16d. The means 19 for establishing an underpressure can be directly connected to pipe section 16e, and not necessarily via the cyclone 20 as shown in FIG. 2.

By establishing a sufficient underpressure and appropriate dimensioning of the pipe peripheries for the pipe section 16e and the pipe section 16c, a part of the liquid will also be discharged from the pipeline 16 via the venting pipe section 16e. It is the lightest portion of the liquid, i.e. the one with high content of gas bubbles, which will be discharged through the venting pipe section 16e. The heaviest part of the liquid will be discharged downstream of the pipe section 16c.

It is an advantage that the venting section 16d is of a certain volume, and in particular that the liquid surface is of a certain size. This results in a large interfacial fluid: gas which, together with the underpressure that is established, will provide effective extraction of gases dissolved in the liquid. The air bubbles which are supplied to the liquid from the injector 17 via the upstream pipe section 16a or the horizontal pipe section 16b will also cause smaller particles to be drawn out of the liquid and into the gas phase, and out of the venting pipe section 16e. Foam will also form in this section which is pulled over into the pipe section 16e. The conditions which are established in the venting section 16d, i.e., underpressure, large surface, and liquid with air bubbles, will effectively separate gases from the liquid. The gases are removed via the pipe section 16e, and the largest part of the fluid is taken out via the downstream pipe section 16c.

Further, in the device 10 shown in FIG. 2, a garland 21 with openings 21a for passive suction of air is arranged. This garland 21 can be arranged in the upstream pipe section 16a above the liquid surface in the liquid volume A, or it can be arranged in the horizontal pipe section 16b. The openings 21a can be adjustable so that one can control the amount of air supplied.

Further, in the device 10 shown in FIG. 2, there is an injection device 22 which can supply (inject) liquid to the fluid flow in the pipeline 16. The injection device 22 is preferably arranged in the upstream pipe section 16a but can also be arranged in the horizontal pipe section 16b.

Further, in the device 10 which is shown in FIG. 2, a cyclone 20 is provided for separating liquid and gases flowing through the cyclone from the venting pipe 16e. The means 19 for establishing an underpressure can then be in communication, via the cyclone venting pipeline 16f, with the cyclone 20.

FIG. 2 shows that the first and second volumes of liquid are different, i.e., the liquid is transported through the device 10 to exchange gases and to remove foam and particles in the liquid, while the bulk of the liquid is conducted via the downstream pipeline 16c from liquid volume A to liquid volume B.

FIG. 3 shows an embodiment of the present invention, i.e. where the horizontal pipe section 16b is fitted with several sections for extracting gases (and smaller amounts of liquid) from the pipe section 16b. In the embodiment which is shown in FIG. 3, the device 10 is provided with a cyclone 20 for the separation of gases and liquid discharged from the venting pipe section 16e, but the device will also function without such a cyclone 20. In some embodiments there is more than cyclone 20 being used. The means 19 is the central fan or vacuum pump which constantly causes an underpressure in the pipeline 16 and provides gas extraction, and a section of liquid, from the pipe sections 16e, optionally via pipe section 16f from the cyclone 20.

The liquid is transported via the inlet pipe section 16a and through the pipe section 16 to an outlet via the pipe section 16c. One or more injectors/ejectors 17 are provided in the pipeline 16, preferably in the lower section of the pipeline 16 and in the pipeline section 16b. It is preferred that a pump that supplies liquid, preferably water, to the injectors/ejectors 17 is connected to the injectors/ejectors 17. Also connected to the injectors/ejectors 17 is an open-air hose for the supply of air into the ejectors 17. This occurs with a venturi when water flows through the nozzles.

As shown in FIG. 3, the present invention comprises several sections 16e where gases, particles and a portion of liquid are separated from the liquid stream which is taken in through the pipe section 16a, i.e., the gases/liquid/particles that are discharged from the pipe section 16b via the pipe section 16e are purified for gases, particles and foam in several subsequent purification steps. In FIG. 3, the different pipe sections 16d are shown as 16d, 16d', 16d'' and 16d'''. The pipe section 16d and transfer to the pipe section 16e show the first cleaning step (i.e., as also shown in FIGS. 1 and 2), while the pipe sections 16d', 16e' show the second cleaning step, and the pipe sections 16d'', 16e'' show the third cleaning step, and 16d''', 16e''' show the fourth cleaning step. The final cleaning step, in this embodiment, is carried out in the cyclone 20. The solution according to the invention can comprise two or more such cleaning steps. Optionally, the embodiment of the invention can comprise more cleaning steps than those that are shown in FIG. 3.

Thus, the pipe section 16b is fitted with several pipe sections 16d, 16d', 16d'', 16d''', so that the liquid which flows through the pipe section 16b can be discharged via a number of pipe sections 16d. In each of these, there is a venting section so that gases, particles, foam, and some liquid are vented and fed via pipelines 16e, 16e', 16e'', 16e''' out of the pipeline 20, optionally via the cyclone 20 and the pipe section 16f. The pipe sections 16d, 16d', 16d'', 16d''' have an, in the main, a vertical configuration, but sections of the pipe sections 16d, 16d', 16d'', 16d''' can be inclined as shown in FIG. 3. In the pipe sections 16d, 16d', 16d'', 16d''', water is collected with foam and particles and sucked into the drains, i.e. the pipe sections 16e, 16e', 16e'', 16e'''. Gases/particles/liquid which are discharged from device 10 can be connected and collected in one pipeline, as shown in FIG. 3, and be fed together to the cyclone 20.

It is preferred, as shown in FIG. 3, that the device comprises a number of ejectors 17. As mentioned, an injector/ejector 17 is preferably arranged in the lower section of the pipeline 16a. Experimental testing of the device according to the invention has also shown that it is advantageous to arrange an injector/ejector 17 just downstream of each of the suction towers, i.e. just downstream of each pipe section 16d, 16d', 16d'', 16d'''.

It is also preferred that each of the sucking out towers (i.e. the pipe sections 16d, 16d', 16d'', 16d''') are fitted with respective valves 25, 25', 25'', 25''' for control of the pressure.

Figure 4:
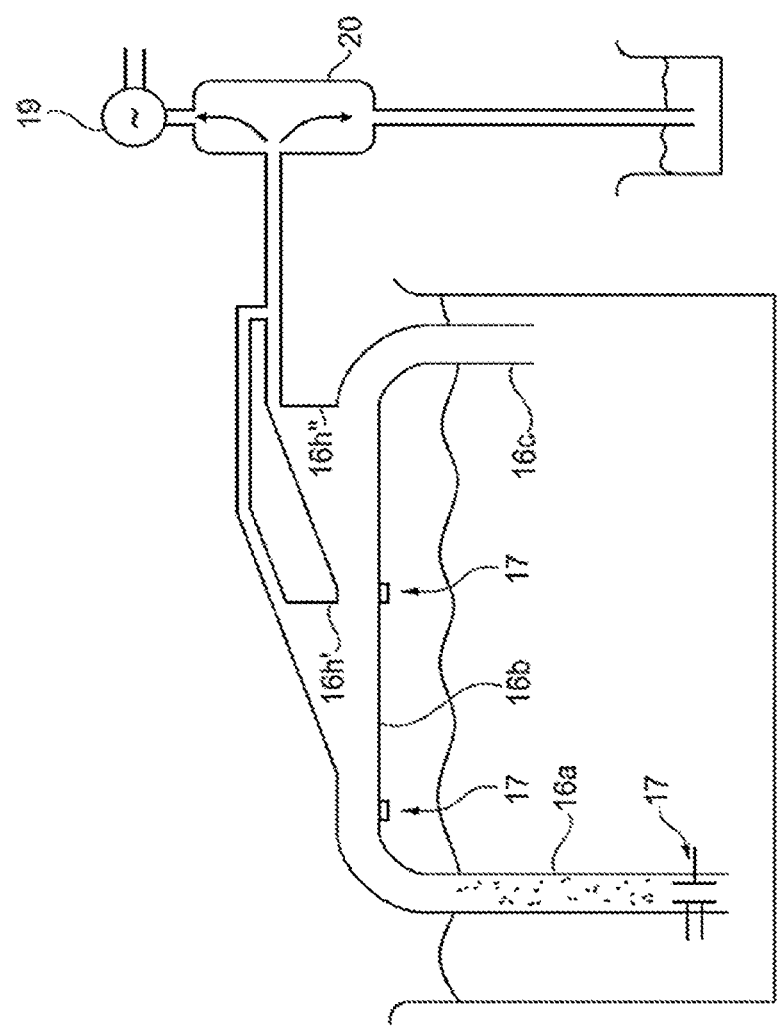
FIG. 4 shows an embodiment in which the horizontal pipe section is provided with venting sections having a longitudinal direction. In the embodiment shown, there are two such longitudinal venting sections.

FIG. 4 shows a solution in which the venting sections 16d are in the form of elongated ducts. In principle, the venting sections 16d in the pipe section 16b can have any shape. Particularly preferred is the circular shape as indicated above and shown, inter alia, in FIG. 3. It is also preferred that the venting sections have a rectangular shape and that they are elongated in the longitudinal direction of the pipe section 16b. In this way, they will form venting ducts 16h.

In a preferred embodiment of the invention, the device 10 is provided with only one such venting duct 16h, preferably of a rectangular shape.

In other preferred embodiments, several such venting ducts 16h are provided, and where the gas vented from these venting ducts 16h is brought together to the cyclone 20. It is preferred that where the venting duct (16h) is formed as an external top section (16h), relative to the pipeline (16b) i.e., which is a rectangular longitudinal box which is external to the pipe section 16b.

Further, one or more wall sections of the top section, i.e. of the venting duct (16h), can be adjusted so that the opening in the venting duct can be adjusted so that it can regulate how much foam/liquid is sucked out.

Figure 5:
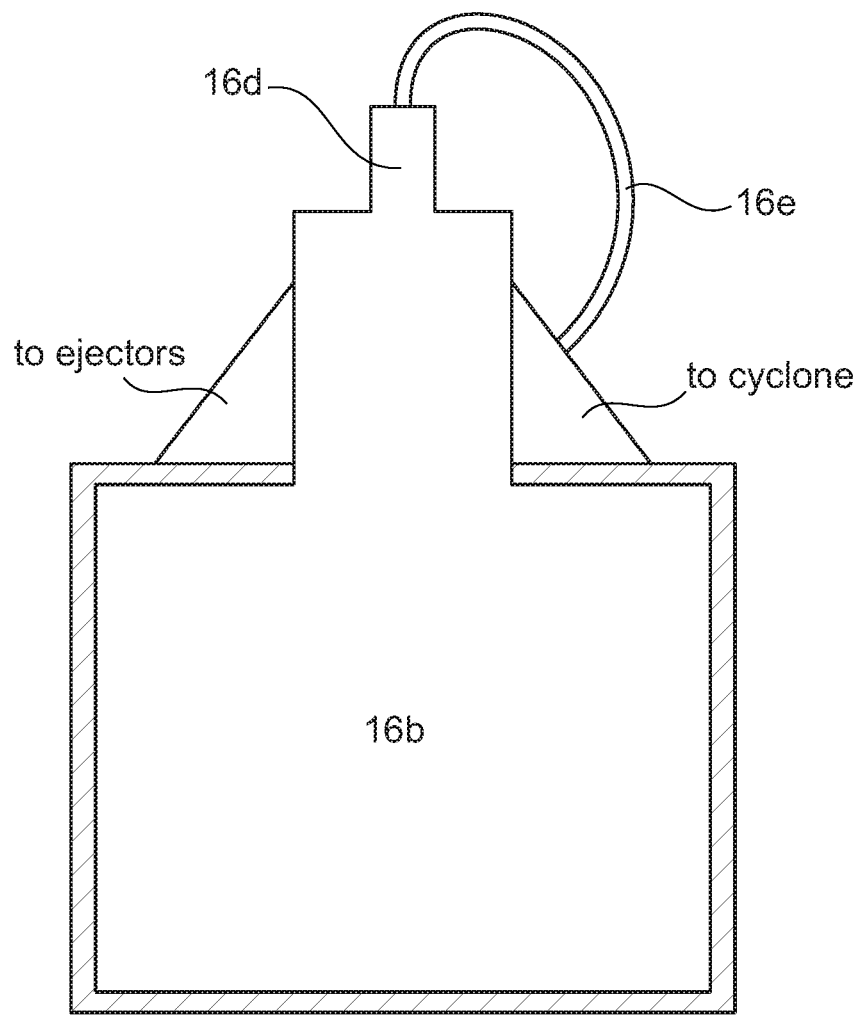
FIG. 5 shows in cross section a configuration of the pipeline 16*b* with a rectangular cross section.

FIG. 5 shows in cross-section an embodiment of pipeline 16b, i.e., that pipeline 16b need not have a circular pipe form. The figure shows a rectangular pipeline 16b. This can, for example, be built as a square profile, i.e., a carrier that is readily in steel or aluminum, or other material. Then the device itself will be able to carry its own weight with water, equipment and walkway, without support. The pipes 16e can then enter a connection rod which is an integral part of this carrier 16b. It can have several integrated runs of water for ejectors 17, water out of the air towers 16d and the pipe 16b itself, as a multi-channel carrier.

From tests we have found that we get the foam drained out and particles and air for each suction tower, and that by injecting new microbubbles right after each tower, we get new air that is not saturated with $CO_2$ and particles, and get thereby an approximate n×improvement, where n is the number of towers/injections. The amount of $CO_2$ in the water will gradually be reduced as it passes through the towers, and approach asymptotically with the natural $CO_2$ level which is just below 1 mg/L water. In fishing tanks, the $CO_2$ level is often between 10-15 mg/L.

The principles of the invention have been confirmed by full scale testing where the device 10 is fitted such that it raises water from the centre of a tank and passes it out and down into an outer segment of the tank. A vacuum pump 19 of an underpressure of 300 mbar will be able to lift the water 3 m up in the pipes. By adjusting the valves 25 one can regulate how high the water is in the individual 16d depending on the height of the horizontal pipe 16b for the individual installation. The horizontal pipe 16b was at a height of 2 m, while connection to the vacuum pump 19 was at a height of 3.5 m. Ejectors 17 fitted 1 m below the water surface at the bottom of the riser 16a, driven by water (30 l/min) at a pressure of 2.5 bar, sucked in air and created microbubbles which were fed to the pipe section 16a. These air bubbles make the water weight in the riser 16a lighter than in the downpipe 16c, thus creating circulation in the pipeline 16. These act as a "syphon". The water flow out of the pipe 16c into the outer ring volume was measured at 330 l/min. The pipe dimension was 110 mm diameter.

At the same time, the air was sucked up in the vent together with foam which was formed by the microbubbles and particles in the water. The foam was separated and drained out as water in the cyclone 20. The experiment was conducted on pure seawater. After 5 min operation we drained 1 litre of water from the cyclone. Samples of this were sent for analysis as this was clearly discoloured. It had a turbidity of FNU 20-30, where the majority of the particles had a size of 2-10 μm.

At the same time, the gas level was measured at the inlet and in the outlet. This showed a drop in gas pressure from 100% to 95%. This confirms that the method is effective both for the removal of gases (especially $CO_2$ since it is easily soluble in water) and the smallest particles, in the same process of moving the water from one place to another. This is therefore also a very energy efficient method.

The invention claimed is:

1. A device (10) for removal of gases in a liquid, and/or for removal of foam and particles from the liquid and/or for transport of the liquid, the device (10) comprising:
    a pipeline (16) to transport the liquid from a first location to a second location, where the pipeline (16) comprises:
    a first upstream pipe section (16a) for intake of liquid;
    a principally horizontal pipe section (16b);
    a downstream pipe section (16c) for passing liquid out of the pipeline (16); and
    a plurality of venting pipe sections (16d) to lead gases, particles, and a portion of the liquid out of the pipeline (16) via at least one further pipe section (16e);
    wherein one or more injector or ejector means (17) is arranged in the first upstream pipe section (16a) and/or the principally horizontal pipe section (16b) for supplying microbubbles to the pipeline (16); and
    wherein means (19) are arranged in the pipeline (16) to establish negative pressure in sections of the pipeline (16).

2. The device (10) according to claim 1, wherein the plurality of venting pipe sections (16d) are arranged in connection with the principally horizontal pipe section (16b) or in a transition between the principally horizontal pipe section (16b) and the downstream pipe section (16c), and wherein the plurality of venting pipe sections (16d) comprises 3 or more venting pipe sections.

3. The device (10) according to claim 1, wherein adjacent to each venting pipe section of the plurality of venting pipe sections (16d, 16d', 16d", 16d''') a further pipe section of the at least one further pipe section (16e, 16e', 16e", 16e''') is arranged for the removal of gases, particles and a part of liquid separated from each venting pipe section of the plurality of venting pipe sections (16d, 16d', 16d", 16d''').

4. The device according to claim 1, wherein the one or more injector or ejector means (17) is provided in the pipeline (16) for supplying gases to the pipeline (16), wherein the one or more injector or ejector means (17) is arranged in the principally horizontal pipe section (16b), or wherein the one or more injector or ejector means (17) is arranged just downstream of one or more venting pipe sections of the plurality of venting pipe sections (16d, 16d', 16d", 16d'''), or wherein the one or more injector or ejector means (17) is arranged in the first upstream pipe section (16a).

5. The device (10) according to claim 1, wherein each of the one or more injector or ejector means (17) is connected to a pump for a supply of water under pressure to the one or more injector or ejector means (17).

6. The device according to claim 1, wherein the one or more injector or ejector means (17) are connected to an open-air hose which brings air to the one or more injector or ejector means (17).

7. The device according to claim 1, wherein the gases, particles and liquid are passed from the plurality of venting pipe sections (16d) to a cyclone (20) for the separation of the gases from the liquid.

8. The device according to claim 7, wherein to an upper part of the cyclone (20) the means (19) are arranged for establishing an underpressure in the cyclone (20) and the plurality of venting pipe sections (16d).

9. The device according to claim 1, wherein 0-25% of the liquid is passed through the pipeline (16) via the at least one further pipe section (16e).

10. The device according to claim 9, wherein 0.01-10% of the liquid is passed through the pipeline (16) via the at least one further pipe section (16e).

11. The device (10) according to claim 1, further comprising a pumping device (18) for pumping the liquid in via the first upstream pipe section (16a) or the principally horizontal pipe section (16b).

12. The device according to claim 1, wherein the first upstream pipe section (16a) and/or the principally horizontal pipe section (16b) comprise a garland (21) with openings (21a), adapted for passively sucking air into a liquid stream which is passing through the principally horizontal pipe section (16b).

13. The device according to claim 1, wherein an addition of air is arranged in the plurality of venting pipe sections (16d) to give an extra lift to the foam.

14. The device (10) according to claim 1, wherein the device (10) is arranged in an installation for breeding marine organisms.

15. The device (10) according to claim 1, wherein the device (10) is arranged in an installation for the treatment of wastewater.

16. The device (10) according to claim 1, wherein in the pipeline (16) there are means for a supply of oxygen, so that oxygen is supplied to the liquid before discharge via the downstream pipe section (16c).

17. The device (10) according to claim 8, wherein the underpressure in the pipeline (16) and the cyclone (20) is sufficient to carry the foam and particles with a gas-liquid flow out of the pipeline (16).

18. The device according to claim 1, wherein a liquid level in a liquid volume A and a liquid volume B is different, so that a water through flow in the pipeline (16) is wholly or partially driven by the level difference.

* * * * *